March 20, 1951  D. McNICOLL  2,545,969
TAPERED ROLLER BEARING

Filed Sept. 1, 1949  2 Sheets-Sheet 1

INVENTOR:
David McNicoll,
BY Carr Farr Gravely,
HIS ATTORNEYS

March 20, 1951 D. McNICOLL 2,545,969
TAPERED ROLLER BEARING
Filed Sept. 1, 1949 2 Sheets-Sheet 2

INVENTOR:
David McNicoll,
BY Cara Carr Gravely,
His ATTORNEYS.

Patented Mar. 20, 1951

2,545,969

UNITED STATES PATENT OFFICE 2,545,969

TAPERED ROLLER BEARING

David McNicoll, Aston, Birmingham, England, assignor to The Timken Roller Bearing Company, Canton, Ohio, a corporation of Ohio Application September 1, 1949, Serial No. 113,630
In Great Britain September 27, 1947

4 Claims. (Cl. 308—218)

This invention relates to tapered roller bearings in which the tapered rollers are maintained in spaced relationship by means of a cage in the pockets or apertures of which the rollers are housed.

When a tapered roller bearing is operating under load, the rollers in the load zone are aligned with the bearing axis by the pressure between the roller ends and the usual thrust rib on one or each bearing race member, and they lie symmetrically in the cage pockets. In the case of rollers which are not in the load zone, however, no positive aligning force operates on them, and there is a tendency for the rollers to skew in the pockets by swinging about their larger ends. This tendency for an unloaded roller to skew is normally restrained by the small end of the roller coming into contact with a side of the cage pocket. The roller therefore tends to swing to and fro in the pocket, so that the smaller end is continually hitting one side or the other of the narrow end of the pocket. The result is that there is a tendency for wear to take place at the narrow end of the pocket, so that eventually a step may be formed which increases the tendency for the roller to remain out of alignment.

The object of the present invention is to obviate the above defects and disadvantages and to provide a roller and cage assembly in which the specific pressure at the point of contact between roller and cage when the roller skews is maintained as low as possible, in which the tendency to wear a step at the side of the cage pocket is reduced; wherein the righting moment exerted by the reaction of the cage on the roller at the point of contact is increased by bringing the said point of contact as far away as possible from the centre of skewing; in which the centering effect of the cage on the roller is improved; and wherein friction between the roller and cage is kept low in the event of the roller dropping right down into the smaller end of the pocket while still spinning.

According to the invention, in a tapered roller bearing, the small ends of the rollers have a convex rounded contour, and the small ends of the cage pockets have a concave rounded contour.

Also, according to the invention, in a tapered roller bearing, the small ends of the rollers are of spheroidal form, and the small ends of the cage pockets are formed as segments of a hollow spheroid with a radius larger than the radius of the roller ends.

Figure 1 of the accompanying drawings is a diagrammatic view of an ordinary tapered roller as it lies symmetrically in the cage pocket when loaded.

Figure 1:
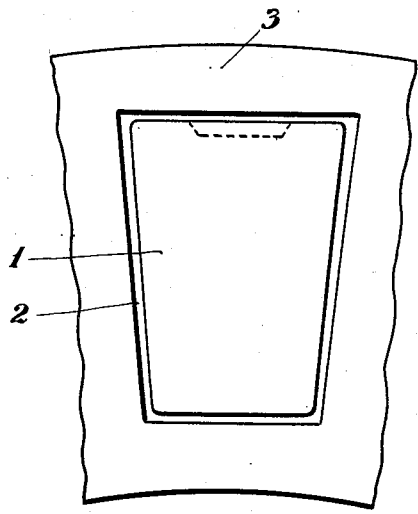
Figure 2:
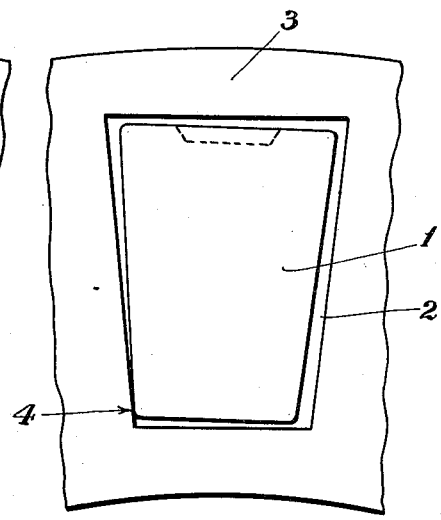
Figure 2 is a similar view showing how the ordinary roller skews in the pocket when unloaded.

Referring to the said drawings, Figure 1 shows diagrammatically how a tapered roller 1 of ordinary form lies symmetrically in the pocket 2 of its cage 3 when it is in the load zone and therefore subjected to the load, and Figure 2 shows how the same roller 1 may skew in the pocket 2, by swinging about its heavier end, when it is not in the load zone. As shown by this view, the tendency of the roller to skew is restrained by the small end of the roller coming into contact with the side of the pocket at point 4. Due to the tendency of the roller to swing to and fro in the pocket, the said small end is continually hitting one side or the other of the narrow end of the pocket, resulting in liability for wear to take place at the narrow end of the pocket, with the possibility of a step being formed at each side at positions corresponding to point 4.

Figure 3:
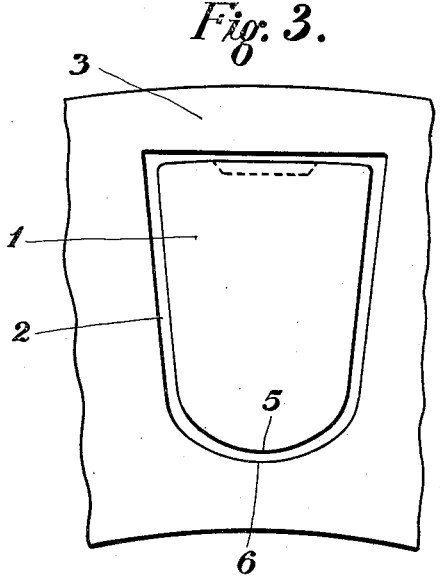
Figure 3 is a diagrammatic view showing a roller and cage pocket in accordance with the present invention, this view representing a loaded roller lying symmetrically in the pocket.
Figure 4:
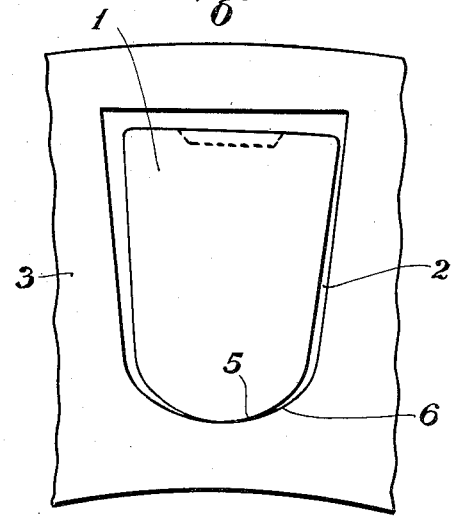
Figure 4 is a similar diagrammatic view showing the position taken by the roller, in an assembly according to the invention, when the roller is unloaded and skews in the pocket.

According to the present invention the rollers and cage pockets in a tapered roller bearing are made of the configuration represented diagrammatically in Figures 3 and 4, the small end of the roller 1 being made spheroidal, at 5, and the small end of the pocket 2 of cage 3 being formed, at 6, as a segment of a hollow spheroid with a radius larger than the radius of the roller end 5.

The spheroidal small end 5 of the roller would be a solid of revolution generated by a surface of which the boundary is formed by three circular arcs, namely, a centre arc struck from the centre line of the roller, the centre being at some point between the centre of gravity of the roller and the small end of the roller; and two side arcs which blend the straight track surfaces corresponding to the sides of the roller with the centre arc. These side arcs are such that the lines of the straight track surfaces, and the central arc, are tangential to them. The spheroidal form of the end portion 6 of the pocket 2 is such that, in the plane of the pocket, the contour of the pocket end is similarly composed of three arcs struck by three radii, each of which would exceed the corresponding radius of the roller end 5 by an amount equivalent to the degree of conformity to be provided between the pocket and the roller end. In the plane at right-angles to the plane of the pocket, the contour of the pocket would conform exactly to the contour of the roller end, so that with the roller resting on the bottom of the pocket, it would, theoretically, have line contact against the pocket end.

From Figure 4 it will be seen that when the unloaded roller 1 skews in the pocket 2, the contacting surfaces of the roller and cage are spheroidal, with a predetermined degree of conformity, so that, at the point of contact, the specific pressure is maintained as low as possible, and the tendency to wear a step in the side of the cage at the point of contact is reduced by virtue of the reduced specific contact pressure. Also, the righting moment exerted by the reaction of the cage on the roller at the point of contact is increased by bringing that point of contact as far away as possible from the centre of skewing.

Further, the form now given to the small ends of the cage pockets and rollers results in an improvement in the centering effect of the cage on the rollers, whilst in the event of the roller dropping right down into the bottom of the pocket while still spinning, friction between it and the cage is kept low by reason of the spheroidal form and the degree of conformity of the roller end and the cage pocket.

Figure 5:
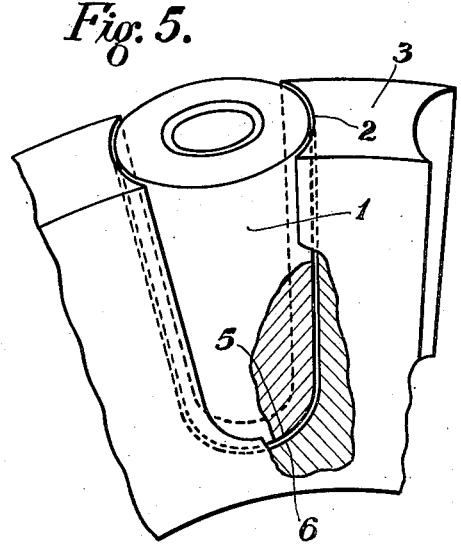
Figure 5 is a perspective view, partly in section, of a portion of one form of roller and cage assembly in accordance with the invention.
Figure 6:
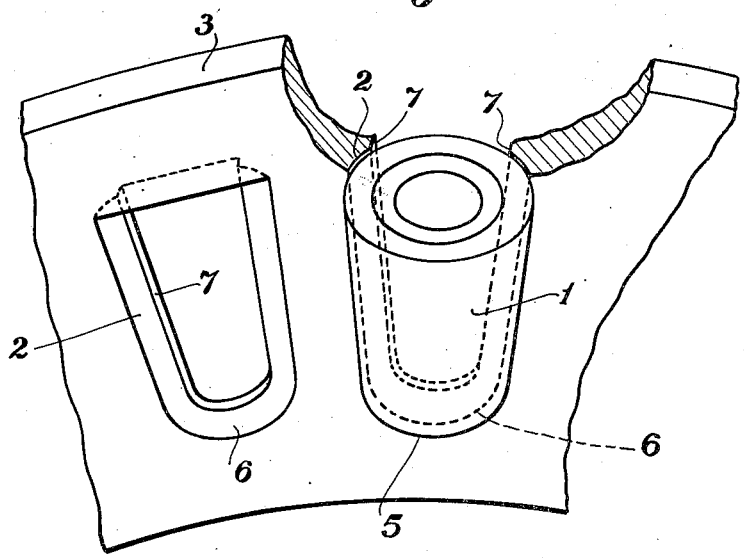
Figure 6 is a fragmentary perspective view, with a portion of the cage broken away, of another roller and cage assembly in accordance with the invention.

A practical application of the invention to a cage for a thrust bearing is shown in Figure 5, and one for a combined radial and thrust load type of bearing is shown in Figure 6. In the former case the rollers 1 are inserted axially into open outer ends of pockets 2 bored radially in the cage 3, the smaller end of each roller having the spheroidal form, at 5, as hereinbefore described, and the smaller closed end of each pocket 2 having the spheroidal form at 6, as above described, with a predetermined degree of conformity between the contour of the roller and the cage pocket. It will be seen that in a transverse direction the contour of the pocket conforms exactly to the contour of the roller.

In the cage 3 shown in Figure 6, the pockets 2 are formed with transversely curved seating surfaces conforming to the surface contour of the roller 1 and so disposed that the pockets are narrower at their outer sides, between lips or flanges 7, than at their inner sides. The rollers are introduced into the pockets from the said inner sides by a movement transverse to their axes, and they protrude through the pockets at the outer sides, the restricted distance between the lips or flanges 7 preventing them from passing right through the pockets. Figure 6 shows one pocket without the roller, and another pocket with the roller in place therein. The smaller end of each roller and pocket is of the spheroidal form hereinbefore described, the said end of the roller 1 having a spheroidal form at 5, and the small end of the pocket 2 having a spheroidal form at 6, with a predetermined degree of conformity between the roller and pocket.

I claim:

1. A tapered roller bearing comprising tapered rollers located in tapered pockets of a cage, said rollers having small ends which are of spheroidal form, and the small ends of the pockets being formed as segments of hollow spheroids with a radius larger than the radius of the small ends of the rollers.

2. A tapered roller bearing comprising tapered rollers located in tapered pockets of a cage, said rollers having small ends which are of spheroidal form, and the small ends of the pockets being formed as segments of a hollow spheroid with a radius larger than the radius of the small ends of the rollers so as to provide a predetermined degree of conformity between the contour of the said roller ends and the contour of the said pocket ends.

3. A tapered roller bearing comprising tapered rollers located in tapered pockets of a cage, said rollers having small ends which are of spheroidal form, and the small ends of the pockets being formed as segments of hollow spheroids with a radius larger than the radius of the small ends of the rollers; the said spheroidal small end of each roller being a solid of revolution generated by a surface of which the boundary is formed by three circular arcs, namely, a centre arc struck from the centre line of the roller at a point between the centre of gravity and the small end, and two side arcs joining the centre arc to the straight track surfaces.

4. A tapered roller bearing comprising tapered rollers located in tapered pockets of a cage, each of said rollers having a small end which is of spheroidal form, being a solid of revolution generated by a surface of which the boundary is formed by three circular arcs, namely a centre arc struck from the centre line of the roller at a point between the centre of gravity and the small end, and two side arcs joining the centre arc to the straight track surfaces; and the small end of each pocket being formed as a segment of a hollow spheroid with the contour composed of three arcs struck by three radii each of which exceeds the corresponding radius of a roller by an extent equivalent to a predetermined degree of conformity between the pocket end and the roller end.

DAVID McNICOLL.

REFERENCES CITED

The following references are of record in the file of this patent:

UNITED STATES PATENTS

| Number | Name | Date |
|---|---|---|
| 718,111 | Eveland | Jan. 13, 1903 |
| 992,949 | Eveland | May 23, 1911 |
| 1,011,029 | Chambers | Dec. 5, 1911 |